Figure 1:
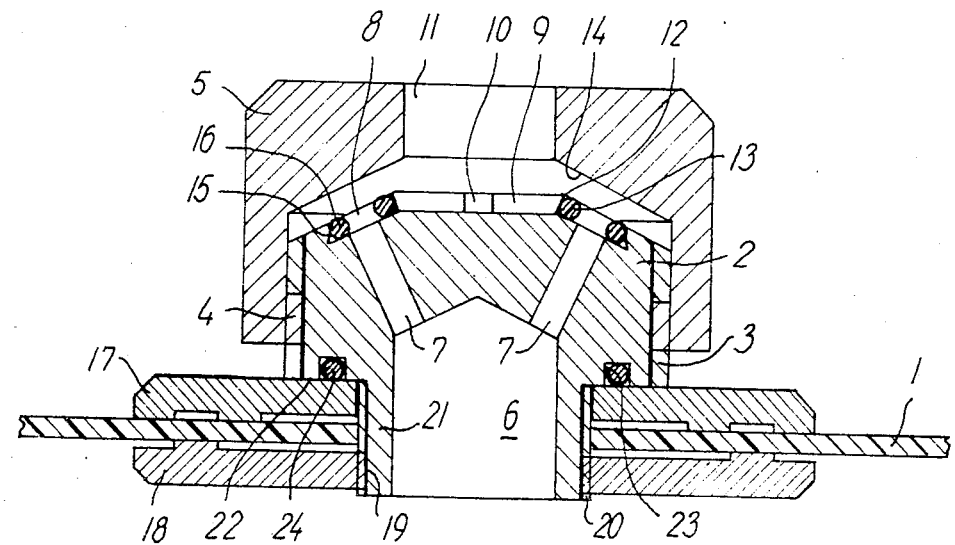

United States Patent [19]

Hansen

[11] Patent Number: 4,669,498
[45] Date of Patent: Jun. 2, 1987

[54] CONTROLLABLE AIR VALVE FOR AN INFLATABLE BODY

[76] Inventor: Jorgen Hansen, No. 44 Webersgade, DK-2100 Copenhagen 0, Denmark

[21] Appl. No.: 923,148

[22] PCT Filed: Feb. 21, 1986

[86] PCT No.: PCT/DK86/00016

§ 371 Date: Oct. 15, 1986

§ 102(e) Date: Oct. 15, 1986

[87] PCT Pub. No.: WO86/04971

PCT Pub. Date: Aug. 28, 1986

[30] Foreign Application Priority Data

Feb. 21, 1985 [DK] Denmark ................. 801/85

[51] Int. Cl.⁴ .................................. F16K 15/20
[52] U.S. Cl. ................. 137/223; 137/516.15; 137/860
[58] Field of Search ............ 137/223, 516.15, 860

[56] References Cited

U.S. PATENT DOCUMENTS

| | | | |
|---|---|---|---|
| 222,344 | 12/1879 | Braun | 137/223 |
| 3,293,081 | 12/1966 | Daley | 137/860 X |
| 3,320,097 | 5/1967 | Sugalski | 137/860 X |
| 4,000,857 | 1/1977 | Moen | 137/860 X |

Primary Examiner—Harold W. Weakley
Attorney, Agent, or Firm—Browdy and Neimark

[57] ABSTRACT

The valve comprises a valve socket to be mounted in the wall of an inflatable body, e.g. by a snap fastener device, and a valve cap having an internal thread for threaded connection with an external thread on the valve socket. The valve socket includes an air duct with a short duct section which is connected with the outer surface of the valve socket only through a number of narrow ducts discharging at the bottom of an annular groove from whose internal edge a number of radial ducts are connected with a central bore provided in the cap. At the internal edge of the annular groove a pressure sensitive annular sealing member is provided which by the pressure from the outside will be pressed out on a larger diameter in the annular groove. By eliminating the pressure action the sealing member reoccupies its initial position in airtight abutment between the bottom plate of the annular groove and an internal annular surface in the cap.

5 Claims, 2 Drawing Figures

CONTROLLABLE AIR VALVE FOR AN INFLATABLE BODY

This invention relates to a controllable air valve for an inflatable body, comprising a valve socket adapted to be airtight secured in the wall of the body and having an air flow duct leading to the interior of the body, means for connecting an outer air source to the air flow duct of the socket and an air pressure sensitive sealing member allowing air flow from the outside into the interior of the body, but which in an operative state prevents air flow in the opposite direction, means being provided for releasing the sealing member with a view to evacuation of said body.

Without being restricted thereto it is an object of the invention to provide a simple and easily operable air valve for use in connection with floating bodies of the kind used inter alia when laying submarine cables.

With respect to such floating bodies it is in particular desired that a comparatively easily controllable air evacuation may be effected upon complete inflation with a view to controlled gradual submersion of the cable, but this is, however, difficult to obtain by prior valves for that purpose.

With a view to the above the air valve according to the invention is characterized in that the air duct of the valve socket comprises a duct section facing the interior of the body and being connected with the outer surface of the valve socket only through a number of comparatively narrow ducts discharging into the bottom face of a countersunk annular groove on the outer surface of the valve socket, said annular groove being connected with a central depression in the outer surface of the valve socket through a number of radial ducts discharging opposite respective ones of said narrow ducts, said sealing member being constituted by a resilient annular located against the inner edge of the annular groove within the discharge openings of said narrow ducts, and a cap having a bore located opposite the central depression of the socket and fitted for external threaded connection with the valve socket includes an annular surface surrounding said bore and adapted to abut airtight against said sealing member.

When inflating the body with the valve socket and the cap tightly secured the pressure provided by the air source through the radial ducts will press the sealing member in the annular groove of the valve socket out on a larger diameter so that the air is made to flow through the duct system of the valve socket into the interior of the body.

As soon as the pressure action has ceased the annular resilient sealing member will return to its initial position at the internal edge of the annular groove where it blocks the air flow from the narrow ducts of the valve socket into the radial ducts on the outer surface of the socket.

Upon complete inflation an easily controllable gas discharge is effected from the body by gradually loosening the threaded connection between the cap and the valve socket, thereby releasing the abutment between the sealing member and the annular surface of the cap. The discharge of gas may at any time be stopped by tightening the threaded connection in order to restore the airtight abutment between the sealing member and the annular surface of the cap.

The two main components of the valve, i.e. the valve socket and the cap, may be separately manufactured from a moulded plastic blank, thereby reducing the manufacturing costs.

With a view to simple mounting in the inflatable body a preferred embodiment of the valve is characterized in that a securing device for the valve socket comprises two annular members provided with mutually engaging snap fasteners and adapted to be mounted on the outer surface and the inner surface of the body wall, said internal annular member having a threaded bore to be connected with an external thread on an insertion portion of the valve socket, an abutting surface on the valve socket adapted to abut by pressure against the external annular member being provided with an annular groove for receiving a resilient sealing member.

Figure 2:
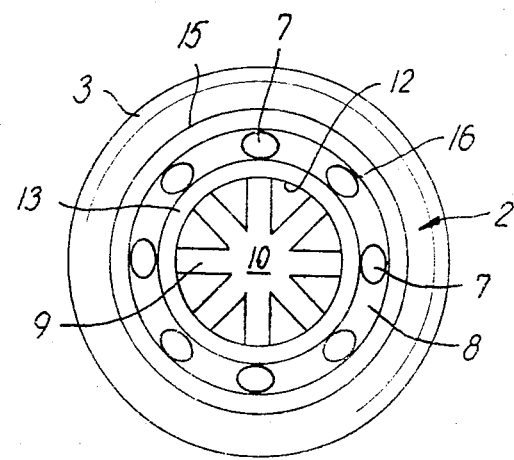

The invention is explained below in closer detail with reference to the drawing, in which FIG. 1 is an axial sectional view of an embodiment of an air valve according to the invention, and FIG. 2 shows the external surface of a valve socket of the valve in FIG. 1.

The valve adapted to be mounted in a wall 1 of an inflatable body, e.g. a floating body for use when laying submarine cables, comprises a valve socket 2 with an external thread 3 to be connected with a corresponding internal thread 4 in a cap 5.

The air duct of the valve socket 2 leading to the interior of the inflatable body includes a comparatively short duct section 6 at the innermost end of the valve socket 2, said duct section being connected with the outer surface of the valve socket 2 only through a number of comparatively narrow ducts 7 discharging into the bottom surface of a countersunk annular groove 8 at the external surface of the valve socket 2. The annular groove 8 is connected with a depression 10 provided in the external surface of the valve socket 2 through a number of radial ducts 9 discharging into the annular groove opposite respective ones of said narrow ducts 7. In the assembled state of the valve the depression 10 is positioned opposite a central bore 11 in the cap 5.

An annular, resilient sealing member 13, e.g. an O-ring, which in the tightened condition of the valve is in airtight abutment against an annular surface 14 on the inner surface of the cap 5, is located within the discharge openings of the ducts 7 in the annular groove at the inner edge 12 of the annular groove 8.

In order to prevent air from flowing through the threaded connection between the external thread 3 of the socket and the internal thread 4 of the cap an additional annular sealing member 16, e.g. an O-ring, is located at the outer edge 15 of the annular groove 8 opposite the discharge openings of said narrow ducts.

The cap is in a manner, not shown, adapted to be connected with a hose connector from an air source (likewise not shown), e.g. a pressurised air cotainer or an air pump.

In the tightened condition of the valve with the sealing member 13 in airtight abutment between the bottom surface of the annular groove 8 and the annular surface 14 of the cap 5, the sealing member 13 is by the gas pressure from the outside forced out on a larger diameter in the annular groove 8, thereby allowing air flow from the radial ducts 9 to the narow ducts 7. In this respect it is advantageous if the bottom surface of the annular groove 8 and the annular surface 14 parallel thereto on the cap 5 are conical, e.g. at an angle of about 75° in relation to the axis of the valve, thus providing for obtaining an optimum matching of the gas pressure necessary to open the passage between the radial ducts 9 and the narrow ducts 7 discharging opposite respective ones of said ducts, and the resiliency of the annular member 13.

As soon as the pressure action on the sealing member 13 has ceased by interruption of the supply of air from the outside the sealing member 13 will reoccupy its initial position at the inner edge 12 of the annular groove 8 due to the resiliency of the sealing member 13, on one hand, and the pressure action from the inside through the narrow ducts 7, on the other hand. Thereby, air evacuation from the interior of the inflated body is prevented in the tightened condition of the valve.

In order to provide a controllable evacuation of air from the inflated body the threaded connection between the external thread 3 of the valve socket 2 and the internal thread 4 of the cap 5 is released to such a degree that the airtight abutment between the sealing member 13 and the annular surface 14 is eliminated. The discharge of air caused thereby may optionally be stopped by retightening the threaded connection.

In the illustrated embodiment the valve is secured in the wall 1 of the inflatable body by a snap fastener device comprising two annular members 17 and 18 to be mounted on the external and the internal surfaces of the wall 1, respectively. The internal annular member 18 has a threaded bore 19 to be connected with an external thread 20 on an insertion portion 21 of the valve socket 2. For abutment against the outer surface of the external annular member 17 the valve socket is provided with an abutting surface 22 having an annular groove 23 for receiving a resilient sealing member 24, e.g. an O-ring. When tightening the threaded connection between the valve socket 2 and the internal annular member 18 an airtight connection of the valve socket 2 with the resilient wall 1 of the inflatable body is established.

Due to the simple structure of the valve the manufacturing costs may be kept low, for instance by manufacturing the valve socket 2 and the cap 5 from moulded plastic material.

Even though the valve according to the invention aa a consequence of the easily controllable evacuation of air from fully inflated condition is particularly suited for inflatable floating bodies of the above mentioned type it is, by virtue of its simple structure and low manufacturing costs, applicable also in connection with any other types of inflatable bodies.

I claim:

1. A controllable air valve for an inflatable body, comprising a valve socket (2) adapted to be airtight secured in the wall (1) of the body and having an air flow duct leading to the interior of the body, means for connecting an outer air source to the air flow duct of the socket and an air pressure sensitive sealing member (13) allowing air flow from the outside into the interior of the body, but which in an operative state prevents air flow in the opposite direction, means being provided for releasing the sealing member (13) with a view to evacuation of said member, characterized in that the air duct of the valve socket (2) comprises a duct section (6) facing the interior of the body and being connected with the outer surface of the valve socket (2) only through a number of comparatively narrow ducts (7) discharging into the bottom face of a countersunk annular groove (8) on the outer surface of the valve socket, said annular groove (8) being connected with a central depression (10) in the outer surface of the valve socket (2) through a number of radial ducts (9) discharging opposite respective ones of said narrow ducts (7), said sealing member (13) being constituted by resilient annular member located against the inner edge of the annular groove within the discharge openings of said narrow ducts, and a cap (5) having a bore (11) located opposite the central depression (10) of the socket and fitted for external threaded connection with the valve socket (2) includes an annular surface (14) surrounding said bore (11) and adapted to abut airtight against said sealing member (13).

2. An air valve as claimed in claim 1, characterized in that an additional resilient annular sealing member (16) is provided at the outer edge (15) of the annular groove (8) of the valve socket (2) outside the discharge openings of said narrow duct (7) and is adapted to seal against air flow through the threaded connection between the valve socket (2) and the cap (5).

3. An air valve as claimed in claim 1, characterized in that the bottom face of the annular groove (8) of the valve socket (2) and the opposite annular surface of the valve cap (5) are conical with outwardly decreasing diameter.

4. An air valve as claimed in claim 1, characterized in that a securing device for the valve socket (2) comprises two annular members (17, 18) provided with mutually engaging snap fasteners and adapted to be mounted on the outer and inner surface of the body wall (1), said internal annular member (18) having a threaded bore (19) to be connected with an external thread (20) on an insertion portion (21) of the valve socket (2), an abutting surface (22) on the valve socket (2) adapted to abutment by pressure against the external annular member (17) being provided with an annular groove (23) for receiving a resilient sealing member (24).

5. An air valve as claimed in claim 1, characterized in that the valve socket (2) and the cap (5) are made from moulded plastic material.

* * * * *